(12) United States Patent
Kirby

(10) Patent No.: US 8,020,886 B2
(45) Date of Patent: Sep. 20, 2011

(54) STRUCTURAL WINDOW IN COMPOSITE SANDWICH BEAM

(76) Inventor: Richard Albert Kirby, St. Martin d'Uriage (FR)

( * ) Notice: Subject to any disclaimer, the term of this patent is extended or adjusted under 35 U.S.C. 154(b) by 1319 days.

(21) Appl. No.: 11/161,505

(22) Filed: Aug. 5, 2005

(65) Prior Publication Data
US 2007/0028553 A1  Feb. 8, 2007

(51) Int. Cl.
A63C 5/00 (2006.01)
(52) U.S. Cl. .......... 280/601; 280/609; 280/610
(58) Field of Classification Search .......... 52/204.1, 52/211, 717.01, 199, 200; 49/504, 505; 280/601, 280/609, 610
See application file for complete search history.

(56) References Cited

U.S. PATENT DOCUMENTS

| | | | |
|---|---|---|---|
| 4,050,665 A * | 9/1977 | Matthews et al. ............. 248/638 |
| 4,563,020 A | 1/1986 | Arieh | |
| 4,747,613 A | 5/1988 | Brichoud | |
| 4,823,525 A * | 4/1989 | Roberts et al. .................. 52/200 |
| 5,757,269 A * | 5/1998 | Roth et al. ..................... 340/542 |
| 6,084,555 A * | 7/2000 | Mizoguchi et al. ............... 345/8 |
| 6,588,155 B1 * | 7/2003 | Theune et al. .................. 49/504 |
| 6,918,216 B2 * | 7/2005 | Hoy et al. ....................... 52/200 |
| 7,011,331 B2 * | 3/2006 | Riepler ......................... 280/601 |
| 7,185,464 B2 * | 3/2007 | Bracale .......................... 52/200 |
| 7,234,279 B2 * | 6/2007 | Sincic et al. .................... 52/200 |
| 7,322,156 B1 * | 1/2008 | Rillie et al. ..................... 52/200 |
| 7,487,991 B2 * | 2/2009 | Degasperi et al. ............ 280/607 |
| 2004/0075737 A1 | 4/2004 | Kirby | |

* cited by examiner

*Primary Examiner* — Eileen D Lillis
*Assistant Examiner* — Chi Nguyen

(57) ABSTRACT

A window for installation in a sandwich composite beam, notably a ski, that consisting of a window body installed in the composite beam and a tab which forms a structural connection between the window body and the composite beam. The window body protects the composite beam core from moisture and maintains the structural integrity of the beam across the opening of the window. The structural window also provides a platform for an imaging system for measuring speed and displacement.

14 Claims, 18 Drawing Sheets

STRUCTURAL WINDOW IN COMPOSITE SANDWICH BEAM

CROSS-REFERENCE TO RELATED APPLICATIONS

This patent application is related to U.S. Pat. Pub. No. 2004/0075737 by the same inventor.

FEDERALLY SPONSORED RESEARCH

Not applicable

SEQUENCE LISTING OR PROGRAM

Not applicable

BACKGROUND OF THE INVENTION

1. Field of Invention

This invention relates to a structural window in a composite sandwich beam such as a ski or the wing of a composite airplane.

2. Prior Art

Modern skis are almost universally made as composite sandwich beams with a core of wood, foam or similar material and a skin. The skin contains structural materials with high tensile strength, a base and cosmetic sides and top. The structural materials for the skin could be aluminium, fiberglass cloth, carbon fiber cloth, or other material with a high tensile strength. A combination of these materials can also be used, e.g. aluminium and fiberglass together. The base material is often Ultra High Molecular Weight (UHMW) polyethylene. For the cosmetic sides and top ABS is often used.

The structural layers, base, and cosmetic layers are usually glued together with some form of epoxy, which makes a strong, flexible structure and a waterproof enclosure that protects the porous core from exposure to moisture.

The core is often protected from moisture at the tip and tail of the ski by replacing the core in these areas with a non-porous waterproof material such as aluminium or plastic.

The type and thickness profile of the ski core as well as the type and thickness of the skin layers affects how a ski flexes, which in turn is the primary determinant of how a ski performs and how strong the ski is. In addition, skin layers protect the ski core from moisture. If the core material absorbs moisture, the glue boundary between the core and the structural skin layer is compromised and catastrophic ski failure often results. Any discontinuities in the skin and/or core, such as holes or windows, can have serious detrimental effects on ski strength, flex, and performance.

In the past, the primary reason for making a hole in a ski through the cosmetic and structural layers was to mount ski bindings. Although screw holes are small enough to have minimal impact on the flex characteristics of the ski the problem that they pose for the moisture sensitive core is recognized. It is common practice to fill any unused holes in the ski as shown by Brichoud and Rullier U.S. Pat. No. 4,747,613 to ensure that the core always remains dry.

More recently vibration damping devices like that of Arieh and Courvoisier U.S. Pat. No. 4,563,020 and devices that detect the speed and displacement of the skier such as that of this inventor in U.S. Pat. Pub. No. 2004/0075737 or Schelling in German Pat. No. DE 100 14 253 or Gassner and Meier in German Pat. No. DE 195 24 842 have been introduced that require larger holes to be made in the ski and in some cases the holes need to penetrate the ski.

There is very little prior art related to a window in a composite sandwich beam, like a ski, that solves the problems related to moisture, strength, and flexibility. The closest related prior art include the hole in some mountaineering skis and the installation of bolts in composite airplane wings.

Most mountaineering skis, for example the Black Diamond "Virtige" or the Ski Trab "Aero 4" have a hole through the tip of the ski for securing the ski. This hole does not pass through the porous core of the ski, however, but through the non-porous waterproof material used at the tip. In addition, since the hole is in a part of the ski that does not affect the turning characteristics of the ski, nothing is done to maintain a constant flexibility in this area.

In "Understanding Aircraft Composite Construction" by Zeke Smith page 7-7 and 7-8 a method for attaching a bushing through a composite airplane wing is shown. In this method a bushing or insert is installed in the wing core and the structural outer skin is reinforced with additional structural outer skin layers. This method is not possible in a ski, however, where reinforcing the outer layers on the bottom of the ski would seriously affect the glide and flex characteristics of the ski. A different approach is required that redirects the tensile and compression loads in the outer skin through an internal structural element that allows the flex characteristics of the ski to be maintained without adding additional structural skin layers.

One of the reasons that no commercially available speed measurement devices have yet been introduced for skiers is because no one has successfully solved the problems related to installing a window in a ski that doesn't damage the ski structure, change the ski flex characteristics or expose the sensitive core to moisture.

The purpose of the present invention is to provide an apparatus and method for creating a hole through a ski that protects the core of the ski from moisture damage, has minimal effect on the strength and flexibility of the ski, allows the ski to be prepared (waxed, filed and ground) normally, and can be installed during the manufacturing of the ski or after the ski has been made.

OBJECTS AND ADVANTAGES

Accordingly, several objects and advantages of the present invention are:
(1) to provide a window in a composite sandwich beam, notably a ski that protects the ski core from exposure to moisture.
(2) to provide a window in a composite sandwich beam, notably a ski that does not noticeably affect the strength or the flexibility of the ski.
(3) to provide a window in a composite sandwich beam, notably a ski during the manufacturing process or after the ski has been manufactured.
(4) to provide an optical window in a composite sandwich beam, notably a ski that allows the ski base to be prepared (waxed, filed, ground, etc.) without damaging the window.
(5) to provide an optical window in a composite sandwich beam, notably a ski, such that when in sliding contact with snow, the window is exposed and/or in contact with the moving snow.
(6) to provide an optical window in a composite sandwich beam with optical elements for lighting.
(7) to provide an optical window in a composite sandwich beam with optical elements for imaging.

(8) to provide a hermitic environment for optical elements that prevents condensation when bottom surface of window is in contact with a cold surface.

Still further objects and advantages will become apparent from a study of the following description and the accompanying drawings.

SUMMARY OF THE INVENTION

In accordance with the present invention a window assembly comprising a window body with one or more tabs and a means for structurally securing the tabs to a composite sandwich beam. The tabs themselves, or with the addition of structural elements such as a structural web, are used to match the strength and flexibility of the window assembly to that of the composite sandwich beam section that it is replacing.

In the drawings, closely related figures have the same number but different alphabetic suffixes.

Figure 1:
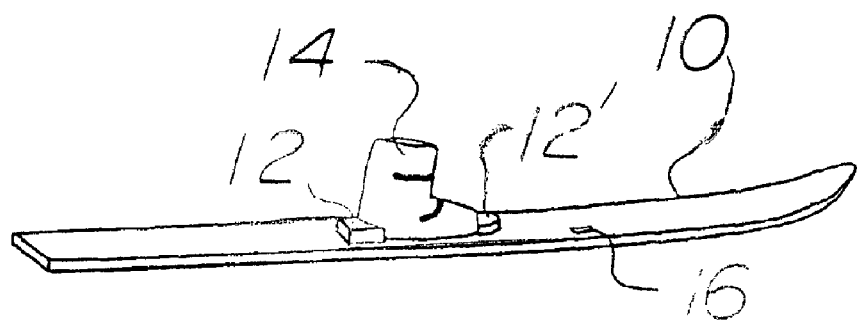
FIG. 1 shows a ski with a binding, boot, and structural window.

REFERENCE NUMERALS 10 ski
12 binding
14 ski boot
16 structural window
18 window body
20 ski core
22 tab
24 structural web
28 mating rib interlock feature
30 bottom window
32 ramp
34 collimating lens
36 illumination source
38 imaging lens
40 hole in window body
42 top window
44 opening in beam
46 shoulder
48 dowel interlock feature
50 mating dowel interlock feature
52 fish scale
54 screw boss
56 rib
58 ski base
60 prism
62 bottom structural skin
64 upper structural skin
66 cosmetic upper surface
68 optical sensor or optical sensor array
70 micro controller
72 power source

DETAILED DESCRIPTION

FIG. 1 to FIG. 6

A preferred embodiment of a structural window is shown in FIG. 1 where the composite sandwich beam is a ski 10. FIG. 1 shows a location of the structural window 16 relative to a ski binding 12 and 12' and a ski boot 14 in ski 10.

Figure 2A:
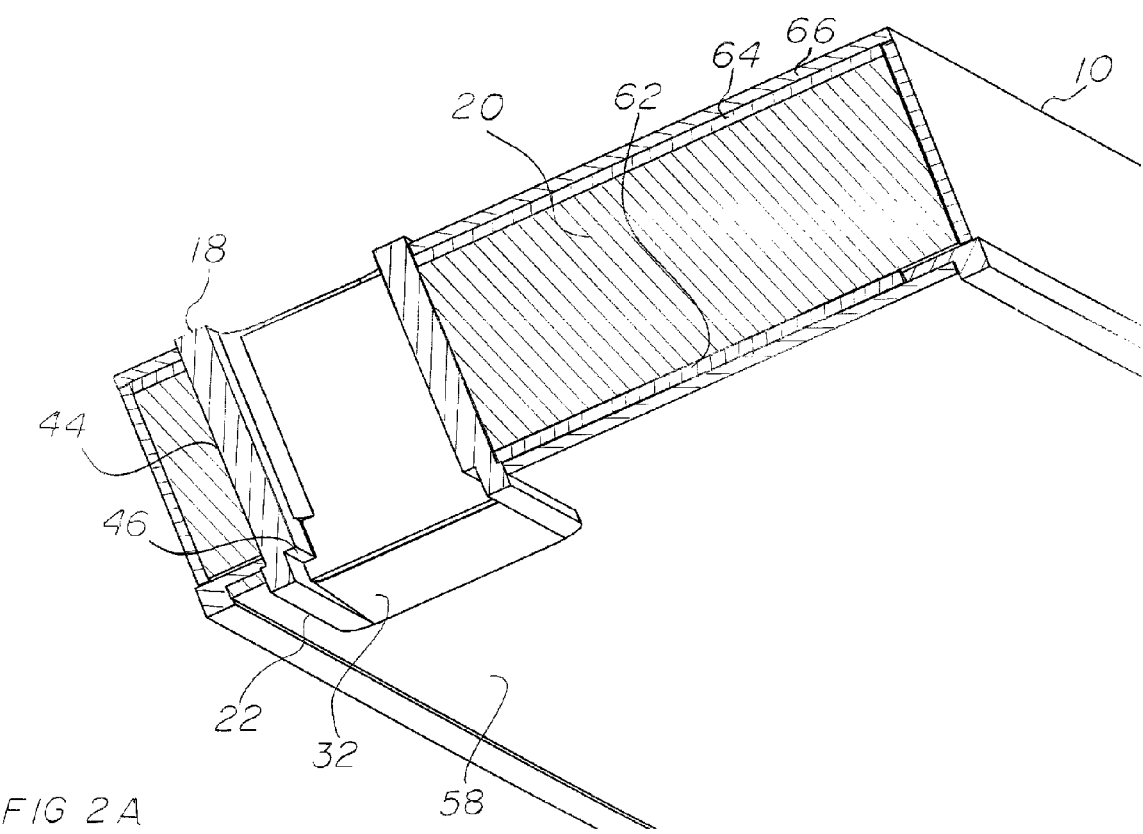
FIG. 2A shows a lateral cross-section of the composite structure of a ski with the ski core, cosmetic layers, structural layers, and window body.
Figure 2B:
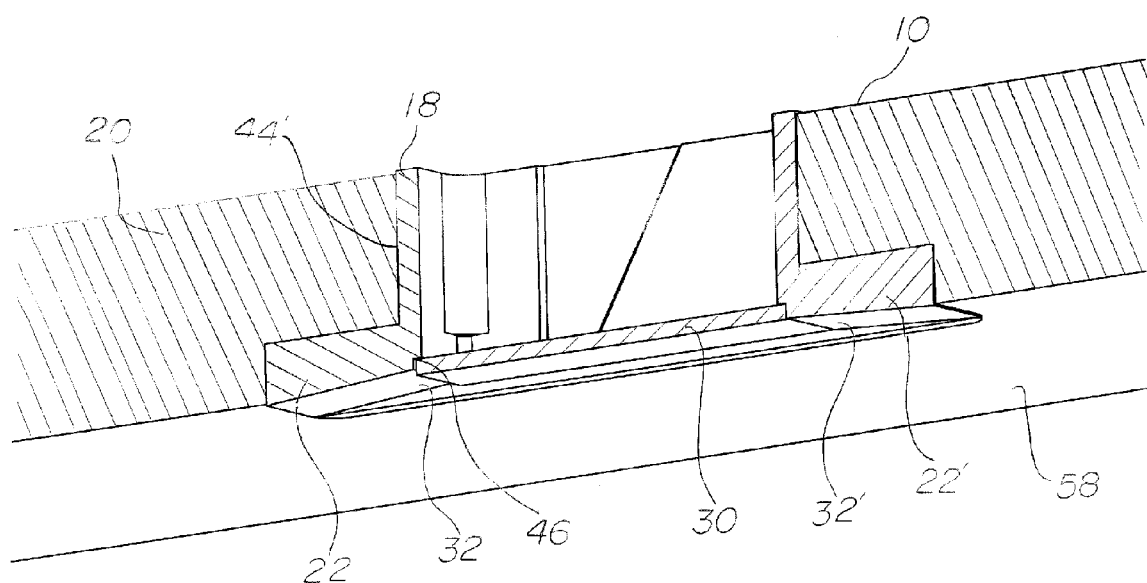
FIG. 2B shows a longitudinal cross-section of a ski with the ski core, cosmetic layers, structural layers, window body, window tabs, bottom window, ramps, and mechanical interlock.

A cross-section of structural window 16 is illustrated in FIG. 2A (lateral cross-section) and FIG. 2B (longitudinal cross-section). Structural window 16 has a window body 18 made of a structurally strong material. The preferred embodiment uses 30% glass filled polyamide, but ABS, polyethylene, UHMW polyethylene, aluminium or another structurally strong material could be used. Window body 18 can be hollow as shown, or can be solid. In the preferred embodiment, the wall thickness of window body 18 is 2 mm thick although other wall thicknesses could be used. In the preferred embodiment, window body 18 extends 1 mm above the upper surface of ski 10 which is made up of an upper structural skin 64 and a cosmetic upper surface 66, although window body 18 could be inset, flush or any distance above the top of ski 10. Window body 18 is attached (glued, ultrasonically welded, molded in place, or other attachment mechanism) inside a ski core 20 of ski 10. In the preferred embodiment a hole in window body 40 has a rectangular form although any other shape could be used. In the preferred embodiment the hole in window body 40 measures 14 mm×28 mm although the hole could be any size. In the preferred embodiment, the walls of the window body are substantially parallel, although they could be tapered as show in FIG. 3G.

FIG. 3A through FIG. 3G show several embodiments of the structural window. In each of the embodiments shown, window body 18 is connected to one or more tabs 22, 22', 22" and 22''' on the bottom and/or top that extend as shown in a longitudinal direction, but could also extend in a lateral direction. Tabs 22 may be formed of the same material as window body 18, or may be made of a different material that is specifically adapted to gliding on snow. In the preferred embodiment, tabs 22 are made from Ultra High Molecular Weight (UHML) polyethylene, which has excellent glide characteristics on snow, but other materials could be used. In the preferred embodiment, tab 22 is between 0.8 mm and 2 mm in thickness although any thickness is acceptable. In the preferred embodiment, tabs 22 are molded onto window body 18, but could be attached later by gluing, ultrasonic welding, or other attachment method. Tabs 22 may or may not be connected directly to window body.

Figure 3A:
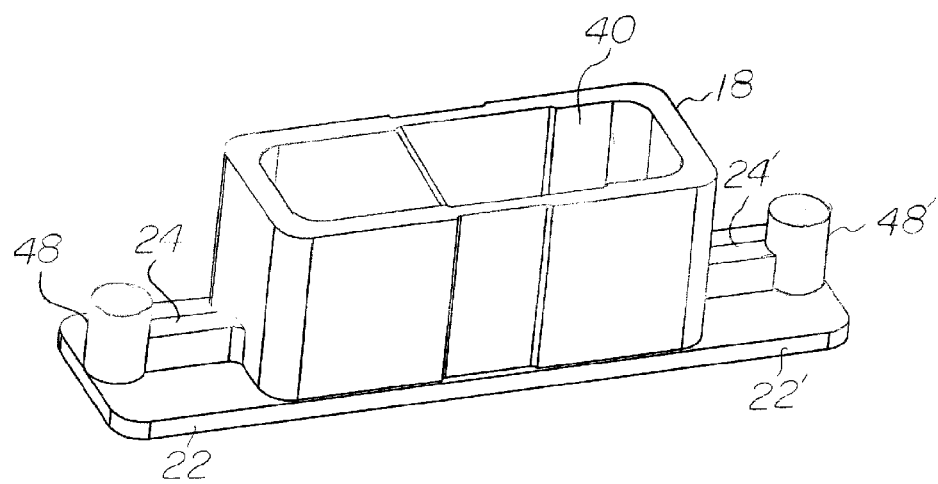
FIG. 3A through 3G show various embodiments of the window body, tabs, structural web, and mechanical interlock.

In the preferred embodiment shown in FIG. 3A a structural web 24 is attached to window body 18 and is attached along tabs 22 just to the extremities of tabs 22. Other structural mechanisms besides webbing (e.g. a thicker tab) could be envisioned. In the preferred embodiment, structural web 24 is molded as part of window body 18 out of 30% glass filled polyamide, but other materials could be used. The height of structural web 24 determines the flex characteristics of structural window 16 and can be modified so that structural window 16 flex matches that of ski 10 while transferring the tensile load in bottom structural skin 62 across opening in beam 44. In the preferred embodiment, structural webbing 24 is 3 mm wide by 4 mm high, but may be adjusted to obtain the desired strength and flexibility characteristics.

Figure 3B:
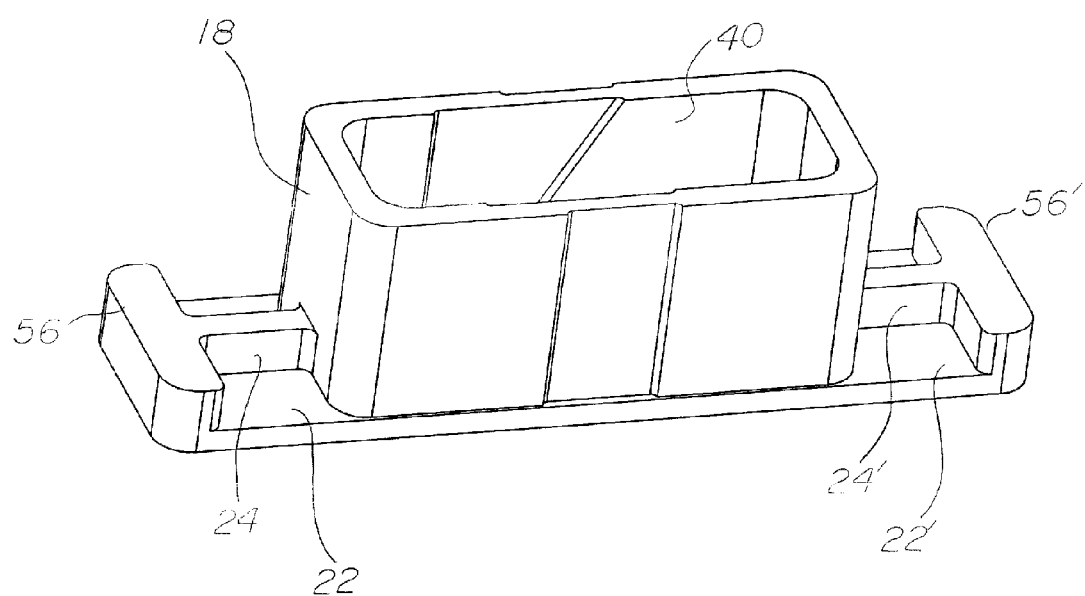
Figure 3C:
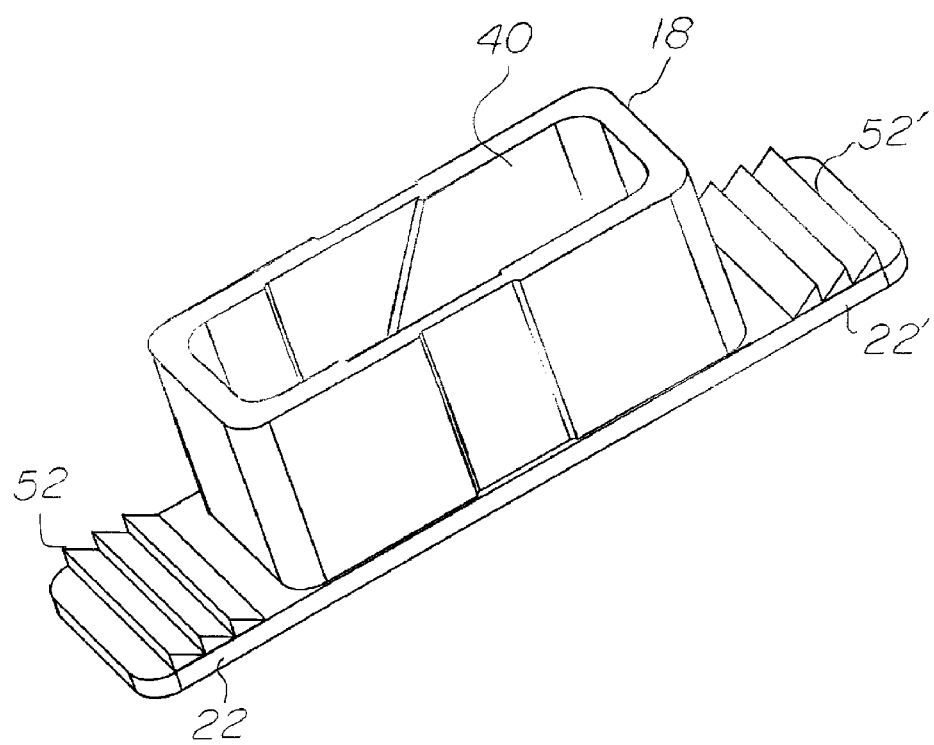
Figure 3D:
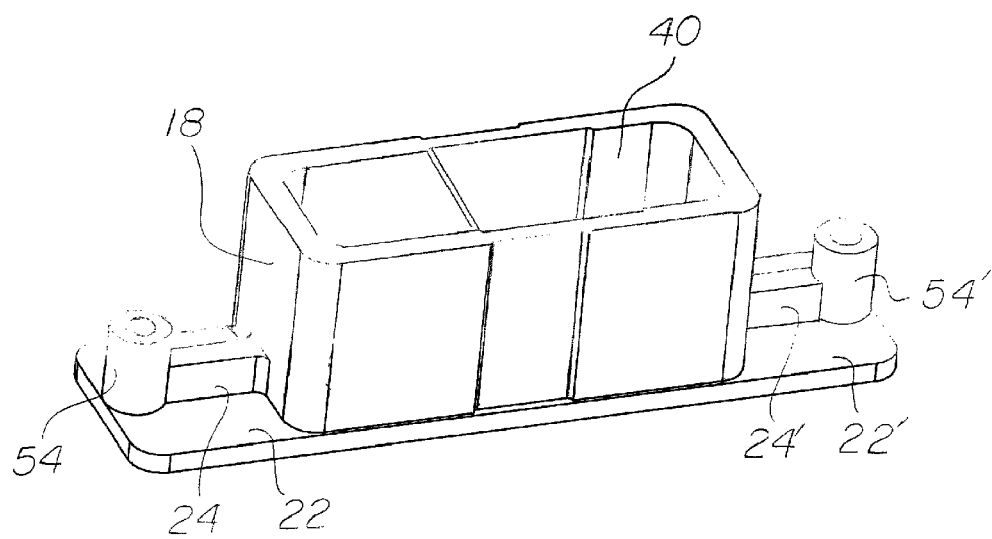
Figure 3E:
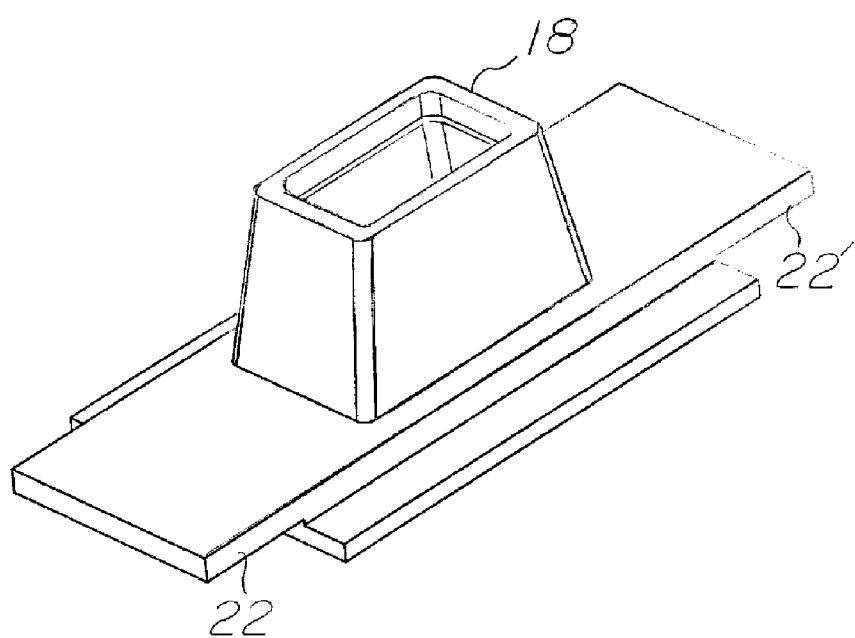
Figure 3F:
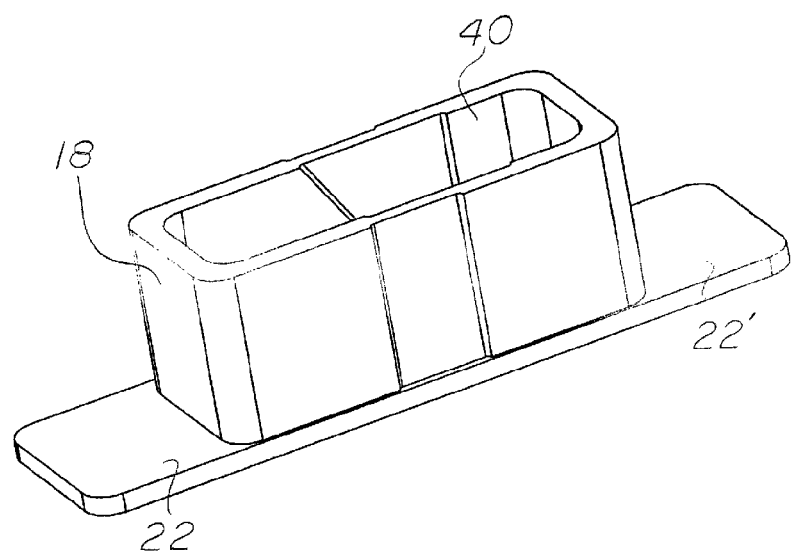
Figure 3G:
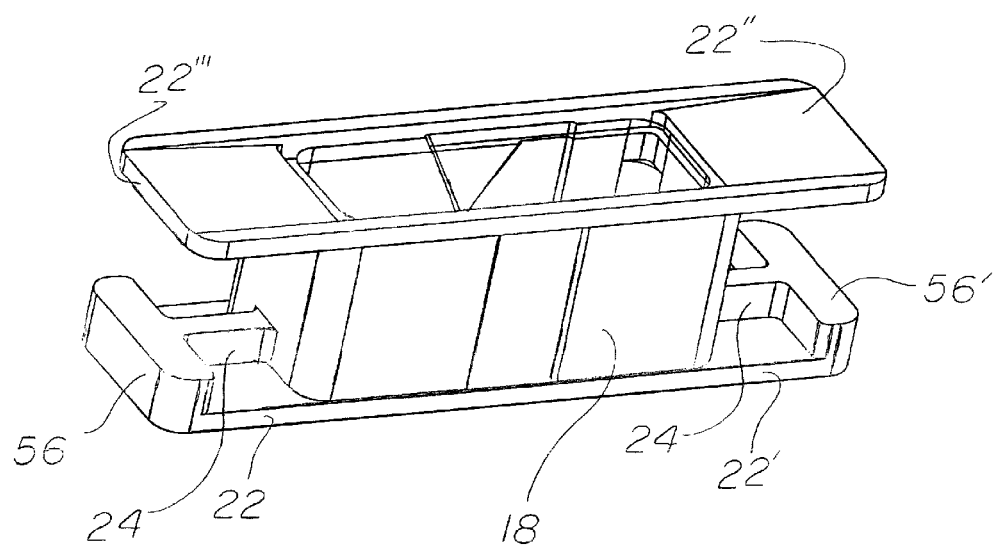
Figure 5A:
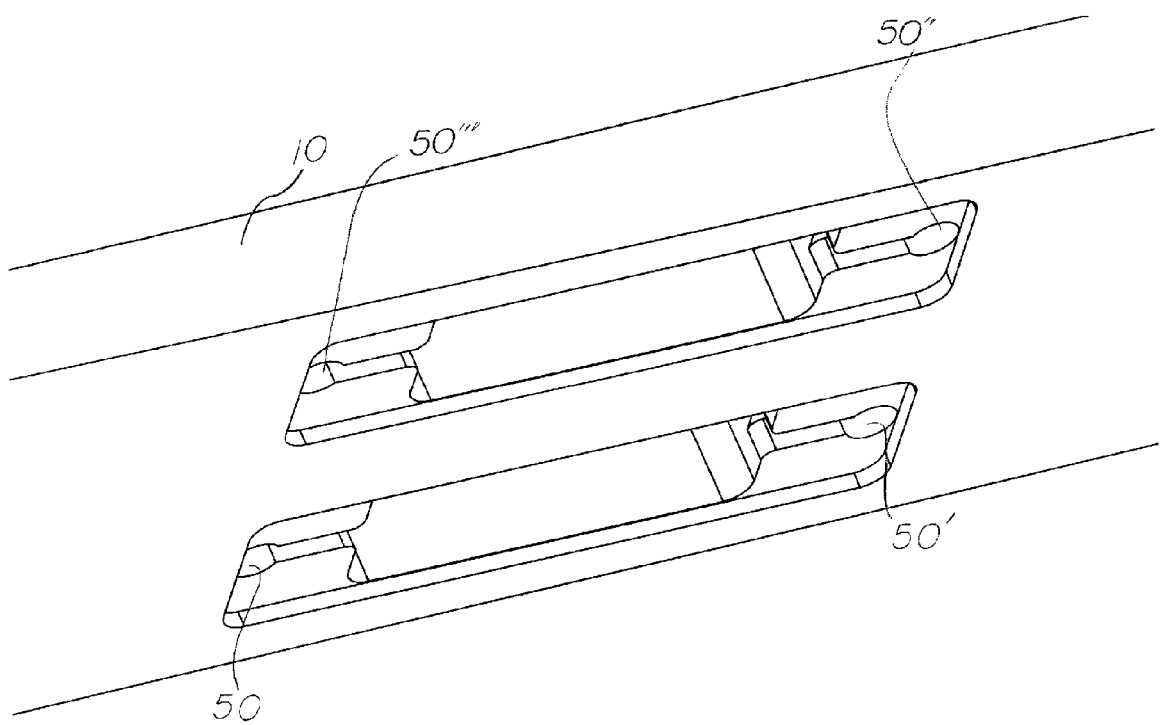
FIGS. 5A and 5B show the mating interlocks in the ski for the window in FIG. 3A and FIG. 3B.
Figure 5B:
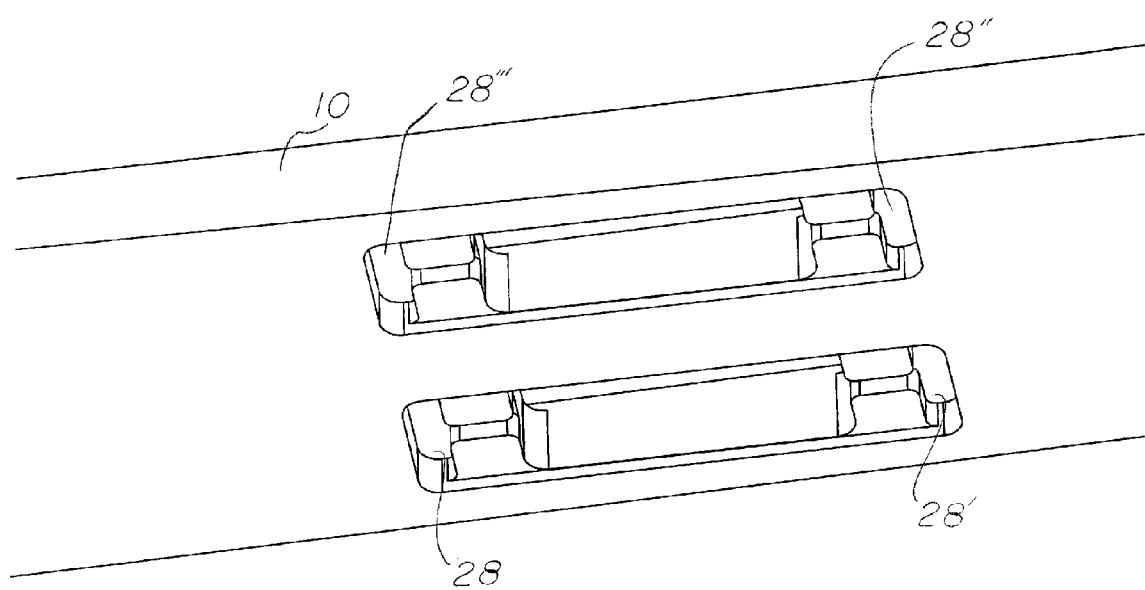

In the preferred embodiment in FIG. 3A a dowel interlock feature 48 and 48' are attached to the extremity of each tab 22. Structural web 24 and 24' are attached to window body 18, tabs 22 and 22', and dowel interlock feature 48 and 48'. FIG. 5A shows four mating dowel interlock features 50, 50', 50", and 50'". An alternative embodiment is shown in FIG. 3B with two ribs 56 and 56' replacing the dowels as interlock features. FIG. 5B shows a matching rib interlock feature 28, 28', 28", and 28'". Additional interlocking mechanisms include fish scales 52 and 52' in FIG. 3C, screw bosses 54 and 54' in FIG. 3D, and glued joints in FIG. 3E and FIG. 3F. One skilled in the art could foresee many other locking mechanisms.

In the preferred embodiment (FIG. 2B longitudinal cross-section) an optically clear bottom window 30 is attached to the window body 18. In the preferred embodiment, this window is made from CR39 a polymerization of the dietilenglycol bis allylcarbonate. Other materials could be used including common glass or sapphire glass. A shoulder 46 is molded into window body 18 to provide support and a surface for attaching bottom window 30 to window body 18 hermetically. Bottom window 30 can be molded in place, ultrasonically welded, or glued. In the preferred embodiment Norland 68 optical quality UV cure glue, is used. This glue allows bottom window 30 to be easily replaced while providing the required moisture seal. One or more ramps 32 and 32' are provided in the window body 18 to allow snow to pass directly against bottom window 30. In the preferred embodiment, bottom window 30 is inset 1 mm from a ski base 58 of ski 10. This distance allows ski base 58 of ski 10 to be waxed, filed, and ground without damage to bottom window 30. Certainly bottom window 30 could be flush with ski base 58 or substantially more inset.

Figure 6A:
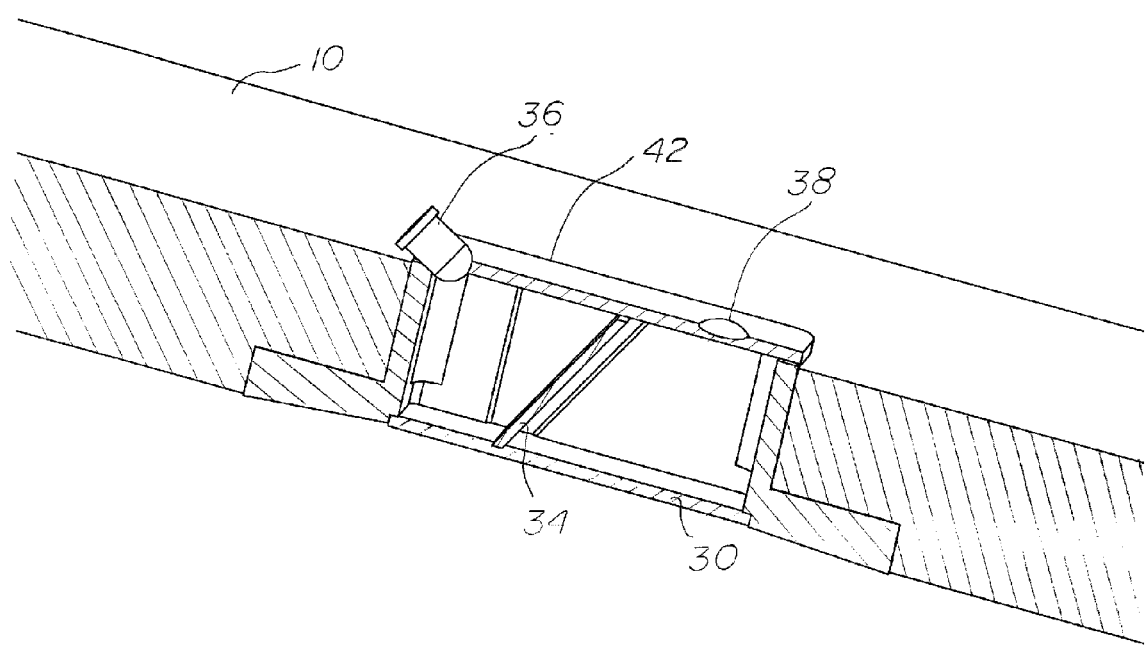
FIGS. 6A and 6B show cross-sections of an illumination system, collimation lens, imaging lens, optical sensor or optical sensor array, micro controller and power source built into structural window.
Figure 6B:
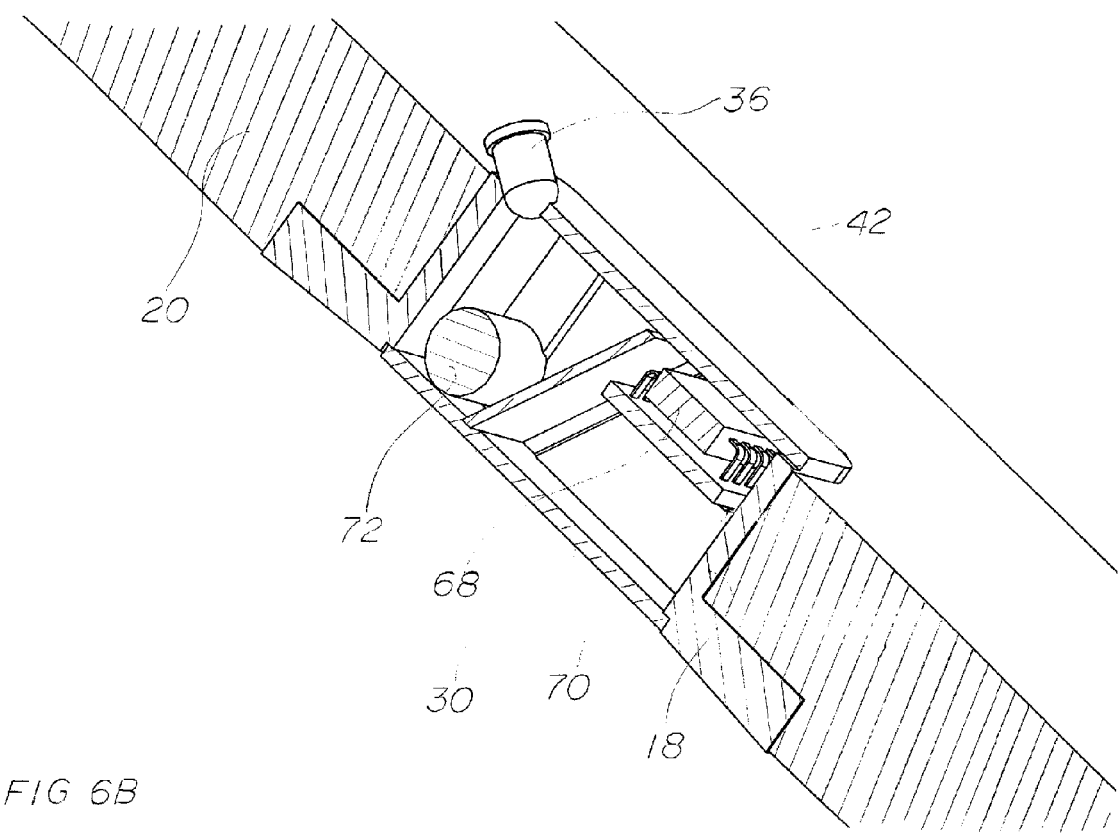

FIG. 6A shows the preferred embodiment of a structural window with an illumination system consisting of a collimating lens 34 attached to the inside of the window body 16, a lighting source 36 attached to window body 18 and/or a top window 42, and an imaging lens 38 in top window 42. One skilled in the art could envision numerous different configurations of optical components including the top window 42 shown in FIG. 4, which includes the imaging lens 38, collimating lens 34 and a prism 60 for guiding the light. FIG. 6B shows an optical sensor or optical sensor array 16, a micro controller 70 and a power source 72 built into the optical window.

Operation

FIG. 1 to FIG. 6

In FIG. 2A structural window body 18 installed in ski 10 provides a means of transferring the tensile load in the bottom structural skin 62 across opening in beam 44. In addition, the structural window body provides a means of transferring the compressive load in upper structural skin 64 cross opening in beam 44.

Tabs 22 provide a means of attaching the window body 18 to the ski core 20. Mechanical interlocks are used in FIGS. 3A, 3B, 3C, and 3D to connect tabs 22 and 22' to ski 10. These mechanical interlocks take the form of dowel interlock feature 48 in FIG. 3A, rib 56 interlock feature in FIG. 3B, fish scale 52 interlock feature in FIG. 3C, screw boss 54 interlock feature in FIG. 3D, and glue interlock features in FIG. 3E and FIG. 3F. The interlock feature mates to a matching interlock feature in ski 10 to provide a strong mechanical connection across opening in beam 44. FIG. 5A shows mating dowel interlock feature 50. FIG. 5B shows mating rib interlock feature 28.

Structural web 24 stiffens tabs 22 and transfers the bending moment in ski 10 across opening in beam 44 to provide the desired flexibility characteristics in structural window 16 area.

Optional bottom window 30 provides a means to prevent snow from entering window body 18, while providing an optically clear window (if desired) through which an instrument could observe the snow beneath the ski.

Ramps 32 guide snow up against bottom window 30 and back to ski base 58 to ensure that the glide properties of the ski are not affected.

Collimating lens 34 and illumination source 36 provide an even lighting on the snow surface for taking optical measurements. Imaging lens, 38, focuses the image for use by an instrument for measuring the snow as in this inventors U.S. Pat. Pub. No. 2004/0075737.

Optional hole in window body 40 allows the transfer of the illumination and image in the case of optical measurements or a place to put a vibration damping apparatus or a mechanical speed measurement system.

Figure 4:
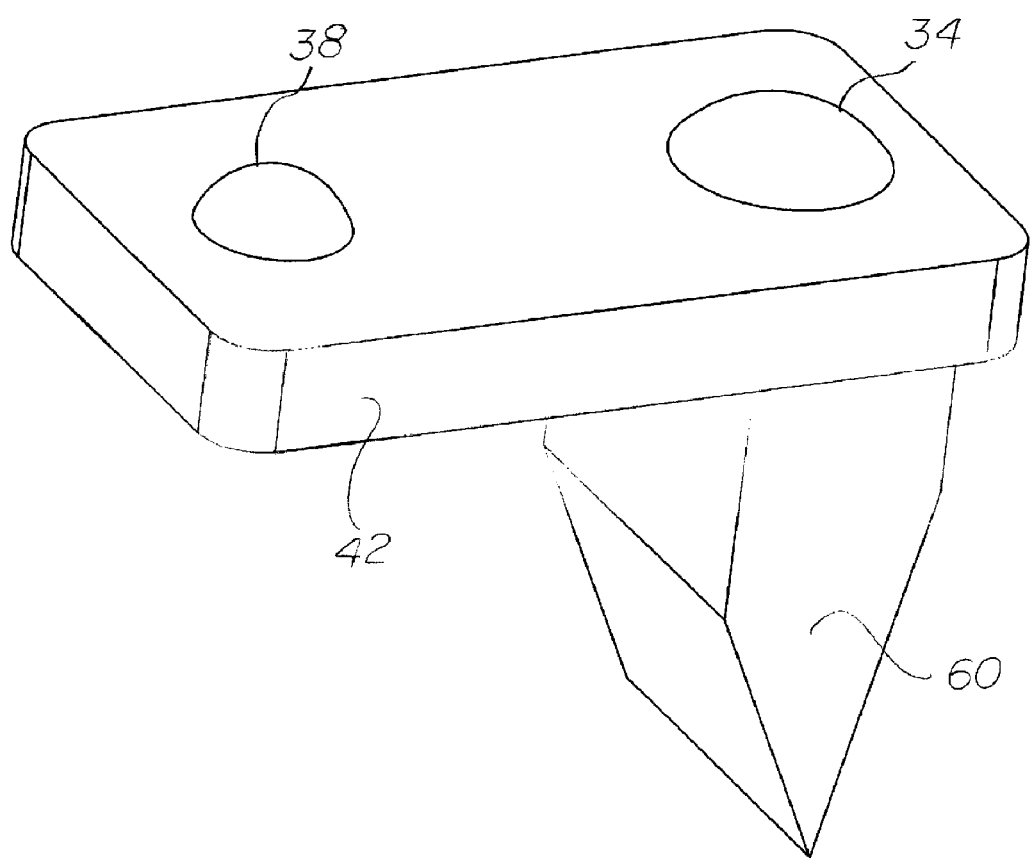
FIG. 4 shows a method of placing optical elements for lighting and illumination inside the window.

Optional top window 42 protects the hole in window body 40 from snow particles or other debris, provides a hermetic seal to prevent condensation on the inside of bottom window 30, and provides a platform for mounting optical components such as illumination source 36, imaging lens 38, optical sensor or optical sensor array 68, micro controller 70 and power source 72 shown in FIG. 4, FIG. 6A, and FIG. 6B.

Figure 7:
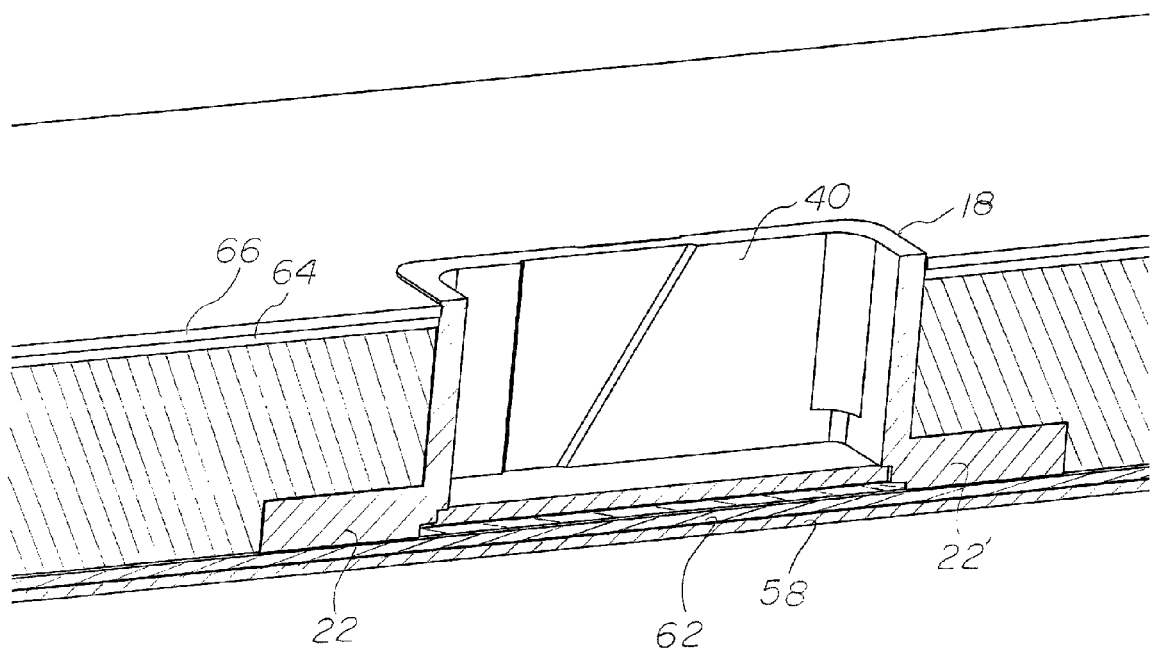
FIG. 7 shows a cross-section of a one-sided window.
Figure 8:
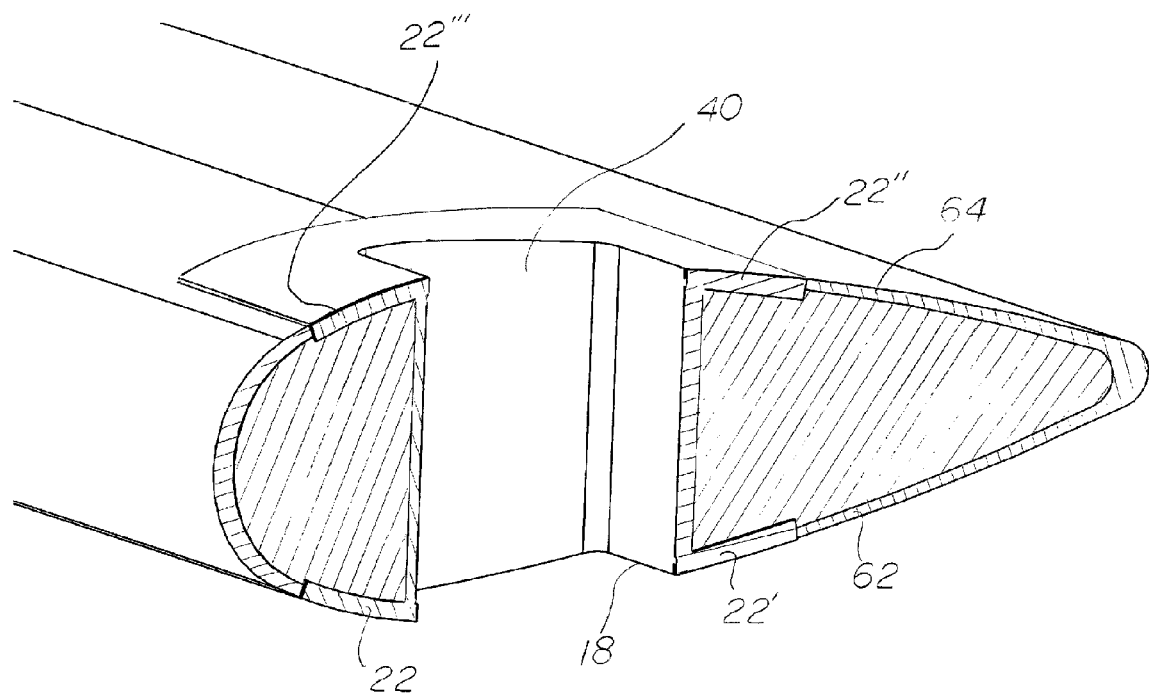
FIG. 8 shows a structural window in a composite sandwich airplane wing.
Figure 9:
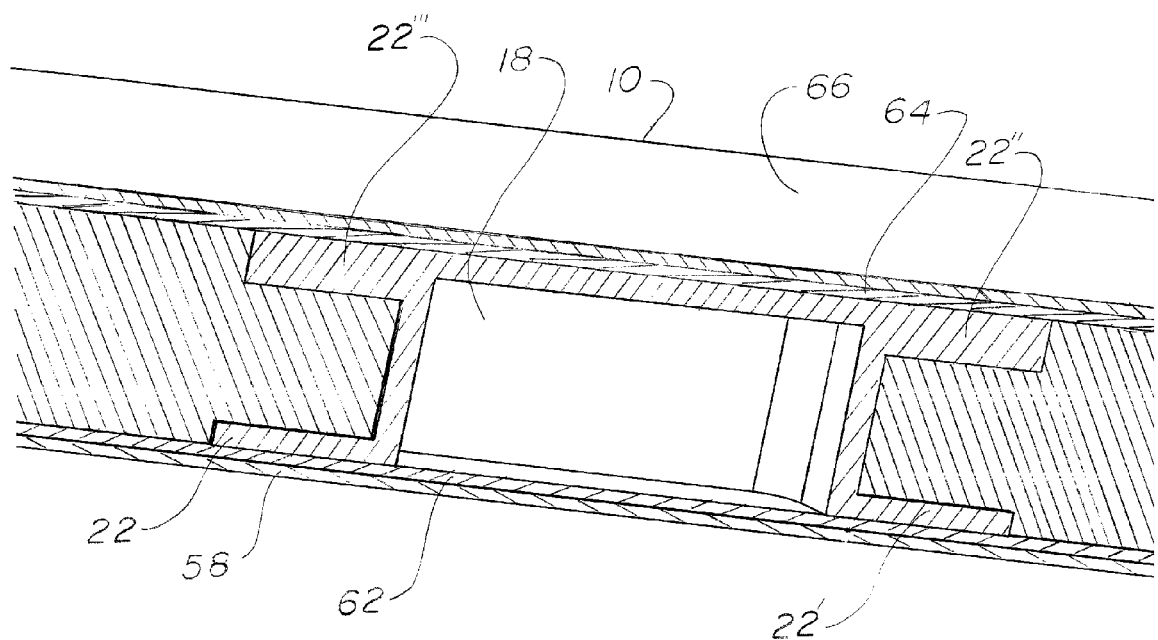
FIG. 9 is a cross section of a structural window body and tabs built inside a ski during the ski manufacturing process.

FIG. 7 TO FIG. 9 Additional Ramifications

In FIG. 7 the structural window is closed on the bottom and used to house a vibration-damping device that can be adjusted from above.

In FIG. 8 the structural window is installed in a composite airfoil.

In FIG. 9 the structural window body 18 with tabs 22 is installed in the ski core 20 prior to the assembly of the structural beam and the skin layers 58, 62, 64 and 66 are assembled above and below without any provisions for a hole through the skin layers. The hole can then be added through the skin layers at a later time without having to install another structural window body with tabs. The embodiment shown in FIG. 9 shows the window body with a hole, however, the window body may be solid when installed and the hole in the window body could be added later.

ADVANTAGES

From the description above, a number of advantages of the structural window become evident:

(1) The structural window provides a means to "see through" a composite sandwich beam without affecting the strength or flexibility of the composite sandwich beam. This is particularly applicable to skis where both strength and flexibility are critical to the performance of the ski and a window is desirable for optical displacement measurements or vibration damping.

(2) The window can be installed during or after the manufacturing process. Installing the window during the manufacturing process optimizes certain parameters like the accuracy of the hole and mating interlock feature cut in the ski as well as the gluing processes. The advantage of being able to install the window in an already made composite beam means that a ski manufacturer could build a small number of skis with the structural window without changing the main manufacturing process. In addition, the window could be installed "aftermarket" by a ski technician in skis that were not intended to have a window in them.

(3) The structural window creates a waterproof seal around the porous beam core, thus protecting it from moisture damage.

(4) The structural window with recessed bottom window allows ski bases to be prepared (waxing, filing, grinding, etc.) without damage to the bottom window.

Accordingly the reader will see that the structural window for a composite sandwich beam can be easily installed in a composite sandwich beam, such as a ski, during or after the manufacturing process without affecting the strength or flexibility of the composite sandwich beam. The beam core is protected from water damage and an optical platform for imaging and illumination is created. In addition, the bottom window of the structural window is protected from damage due to surface preparation that is common practice when the composite beam is a pair of skis.

Although the description above contains many specificities, these should not be construed as limiting the scope of the invention but as merely providing illustrations of some of the presently preferred embodiments of this invention. For example the window body could have many shapes such as cylindrical, square, or elliptical. It may be smaller at the bottom and larger at the top or vice-versa. The walls of the window body may have any sort of detail for mounting components inside or securing on the outside. The interlock may or may not exist and it could be nearly any shape imaginable. The window body does not need to fully penetrate the ski, for example, the top structural skin, bottom structural skin, or both may be left intact or have only small holes in them. It is also possible to put materials between the window body and ski core and/or between tabs and ski core. In addition, in the manufacturing process, the ski core could have a window body with tabs installed inside the structural skin layers. No hole would be made through the structural skin layers until later required for the window. When the window is desired all that is required is to make the hole in the correct location in the structural skin.

More than one window could be placed in a ski. For example two windows side by side could be placed in the ski so that one of the two windows is always close to the snow when the skier is making a turn.

The window may not be entirely embedded in the ski. For example, the window may take the form of a notch in the tail of the ski.

Accordingly, the scope of the invention should be determined not by the embodiments illustrated, but by the appended claims and their legal equivalents.

What is claimed is:

1. A window positioned in a ski made of a composite sandwich beam comprising:
   a. a window body;
   b. one or more tabs;
   c. said one or more tabs being attached to said window body;
   d. an attachment means for structurally fixing said one or more tabs to said composite sandwich beam;
   e. said window body containing one or more items from a list consisting of an imaging lens, a collimation lens, an illumination source, a mirror, a prism, an optical sensor, and an optical sensor array;
   f. and said window body further comprising an optical bottom window composed of a solid transparent material.

2. The window of claim 1 wherein said one or more tabs include a structural reinforcement.

3. The window of claim 1 wherein said means of attachment is glue.

4. The window of claim 1 wherein said means of attachment is a mechanical interlock.

5. The window of claim 1 wherein said solid transparent material is one or more items from a list consisting of plastic, scratch resistant plastic, CR39, glass, scratch resistant glass, quartz, and sapphire.

6. A window positioned in a ski made of a composite sandwich beam comprising:
   a. a window body;
   b. an attachment means for structurally fixing said window body to said composite sandwich beam;
   c. said window body containing one or more items from a list consisting of an imaging lens, a collimation lens, an illumination source, a mirror, a prism, an optical sensor, and an optical sensor array;
   d. and said window body further comprising an optical bottom window composed of a solid transparent material.

7. The window of claim 6 wherein said attachment means comprises one or more tabs.

8. The window of claim 7 wherein said one or more tabs are attached to said window body.

9. The window of claim 6 wherein said solid transparent material is one or more item from a list consisting of plastic, scratch resistant plastic, CP39 glass, scratch resistant glass, quartz, and sapphire glass.

10. The window positioned in a ski made of a composite sandwich beam comprising:
    a. a window body;
    b. an attachment means for structurally fixing said window body to said composite sandwich beam;
    c. said window body further comprising an optical bottom window composed of a solid transparent material;
    d. and said window body further comprising an optical top window composed of a solid transparent material.

11. The window of claim 10 wherein said attachment means comprises one or more tabs.

12. The window of claim 11 wherein said one or more tabs are attached to said window body.

13. The window of claim 10 wherein said window body contains one or more items from a list consisting of an imaging lens, a collimation lens, an illumination source, a mirror, a prism, an optical sensor, and an optical array.

14. The window of claim 10 wherein said solid transparent material is made of one or more items from a list consisting of plastic, scratch resistant plastic, CR39, glass, scratch resistant glass, quartz, and sapphire glass.

* * * * *